(12) United States Patent
Preiss et al.

(10) Patent No.: US 8,978,126 B2
(45) Date of Patent: Mar. 10, 2015

(54) METHOD AND SYSTEM FOR TCP TURN OPERATION BEHIND A RESTRICTIVE FIREWALL

(71) Applicant: Research In Motion Limited, Waterloo (CA)

(72) Inventors: Bruno Richard Preiss, Waterloo (CA); Kaiduan Xie, Waterloo (CA); Jonathan Hong-Man Sau, Waterloo (CA)

(73) Assignee: BlackBerry Limited, Waterloo, CA (US)

( * ) Notice: Subject to any disclaimer, the term of this patent is extended or adjusted under 35 U.S.C. 154(b) by 136 days.

(21) Appl. No.: 13/663,029

(22) Filed: Oct. 29, 2012

(65) Prior Publication Data

US 2014/0123267 A1 May 1, 2014

(51) Int. Cl.
*H04L 29/06* (2006.01)
(52) U.S. Cl.
CPC .................................. *H04L 63/029* (2013.01)
USPC ........................................................ 726/14
(58) Field of Classification Search
None
See application file for complete search history.

(56) References Cited

U.S. PATENT DOCUMENTS

| 2005/0210292 | A1* | 9/2005 | Adams et al. | 713/201 |
| 2006/0215684 | A1 | 9/2006 | Capone | |
| 2009/0116487 | A1* | 5/2009 | Read | 370/392 |
| 2013/0185786 | A1* | 7/2013 | Dyer et al. | 726/12 |

OTHER PUBLICATIONS

European Search Report for EP Application 12190462.7, mailed Mar. 21, 2013.
Rosenberg et al, IETF RFC 5245: "Interactive Connectivity Establishment (ICE): A Protocol for Network Address Translator (NAT) Traversal for Offer/Answer Protocols", Apr. 2010.
Rosenberg et al, IETF RFC 5389: "Session Traversal Utilities for NAT (STUN)", Oct. 2008.
Mahy et al, IETF RFC 5766: "Traversal Using Relays around NAT (TURN): Relay Extensions to Session Traversal Utilities for NAT (STUN)", Apr. 2010.
Postel, IETF RFC 768: "User Datagram Protocol", Aug. 28, 1980.
Information Science Institute University of Southern California, IETF RFC 761: "Transmission Control Protocol", Jan. 1980.
Perreault et al, IETF RFC 6062: "Traversal Using Relays around NAT (TURN) Extensions for TCP Allocations", Nov. 2010.
Rivest, IETF RFC 1321: "The MD5 Message-Digest Algorithm", Apr. 1992.

(Continued)

*Primary Examiner* — Samson Lemma
*Assistant Examiner* — Malcolm Cribbs
(74) *Attorney, Agent, or Firm* — Moffat & Co.

(57) ABSTRACT

A method at a computing client located behind a NAT and restrictive-access firewall, including establishing a control connection with a TCP TURN server utilizing a port capable of traversing the restrictive-access firewall; requesting an allocation of an client service identity from the TCP TURN server; and receiving, from the TCP TURN server, a response containing the client service identity, the client service identity being independent of any port used to communicate with the TCP TURN server. Further a method at a TCP TURN server, including listening on a first port for communications from a computing client, the computing client being behind a restrictive access firewall and the first port capable of traversing the restrictive-access firewall; establishing a control connection with the client on the first port; receiving a request for an allocation of an client service identity from the computing client; and sending a response containing the client service identity.

48 Claims, 9 Drawing Sheets

(56) References Cited

OTHER PUBLICATIONS

Fielding et al, IETF RFC 2616: "Hypertext Transfer Protocol—HTTP/1.1", Jun. 1999.
Rescoria, IETF RFC 2818: "HTTP over TLS", May 2000.
Paterson et al, XMPP Standards Foundation XEP-0124: "Bidirectional-streams Over Synchronous HTTP (BOSH)", Jul. 2, 2010.
Fette et al, IETF RFC 6455: "The WebSocket Protocol", Dec. 2011.
Rosenberg et al, IETF RFC 3261: "SIP: Session Initiation Protocol", Jun. 2002.
3GPP TS 23.040: "Technical Specification Group Core Network and Terminals; Technical realization of the Short Message Service (SMS)", Jun. 2012.
Berners-Lee et al, IETF RFC 1738: "Uniform Resource Locators (URL)", Dec. 1994.
Bernets-Lee et al, IETF RFC 3986: "Uniform Resource Identifier (URI): Generic Syntax", Jan. 2005.
Postel et al, IETF RFC 959: "File Transfer Protocol (FTP)", Oct. 1985.
Berners-Lee et al, IETF RFC 1945: "Hypertext Transfer Protocol—HTTP/1.0", May 1996.
Rigney et al, IETF RFC 2865: "Remote Authentication Dial in User Service (RADIUS)", Jun. 2000.
Rigney et al, IETF RFC 2866: "Radius Accounting", Jun. 2000.
Calhoun et al, IETF RFC 3588: "Diameter Base Protocol", Sep. 2003.
Calhoun et al, IETF RFC 4005: "Diameter Network Access Server Application", Aug. 2005.

\* cited by examiner

METHOD AND SYSTEM FOR TCP TURN OPERATION BEHIND A RESTRICTIVE FIREWALL

FIELD OF THE DISCLOSURE

The present disclosure relates to transmission control protocol (TCP) connections between a Client and Peer, and in particular to TCP connections between a Client and a Peer where the Client is behind a network address translator (NAT) and restrictive firewall.

BACKGROUND

A network address translator (NAT) enhances the security of the network by obscuring the internet protocol (IP) addresses of nodes on the network, thus preventing the nodes from being directly reachable from outside of the network. However, the NAT may also cause issues in real time communications because nodes within the network may not be directly able to receive incoming calls, sessions, communications, dialogs or transactions from outside the network.

The NAT may also be co-located with a firewall. In order to overcome the hindrance caused by a NAT/firewall, various solutions exist. Session Traversal Utilities for NAT (STUN), as defined by the Internet Engineering Task Force (IETF) Request For Comments (RFC) 5389, *"Session Traversal Utilities For NAT (STUN)"*, the contents of which are incorporated herein by reference, provides a way for a Client software on an IP node to learn its assigned address and port on the NAT observed from other networks outside of its network, such as IP nodes on the other side of the NAT. Due to the varieties and complexity of the NAT/firewall functions, STUN itself is not enough to allow incoming traffic to traverse a NAT.

Traversal Using Relays Around NAT (TURN), as defined in IETF RFC 5766, *"Traversal Using Relays Around NAT (TURN): Relay Extensions To Session Traversal Utilities for NAT (STUN)"* the contents of which are incorporated herein by reference, introduces a "Man-In-The-Middle" type server that relays, proxies, or transfers the IP data traffic on behalf of a Client behind the NAT, thus allowing that Client to be reachable from the other side of the NAT. A TURN server relays the traffic between two communicating points. The TURN protocol allows a host behind a NAT, herein called a TURN Client, to request that another host called the TURN Server acts as a relay. TURN is an extension of STUN and most TURN messages have the same formatting as their STUN equivalents.

TURN does not provide a way to communicate a Client's relayed transport address to its Peers, nor does it provide a way for the Client to learn each Peer's external facing IP address and port, which would be a "server-reflexive transport address" if the Peer is also behind a NAT. Other protocols and solutions exists for such communications, including session initiation protocol (SIP) and Interactive Connectivity Establishment (ICE), as defined in IETF RFC 5245, *"Interactive Connectivity Establishment (ICE): A Protocol For Network Address Translator (NAT) Traversal For Offer/Answer Protocols"*, the contents of which are incorporated herein by reference.

However, in some networks, a firewall may restrict TCP connections to use only certain ports. This may be done, for example, for security or privacy reasons. For example, in some networks only TCP ports 80 and 443 may be open for TCP. TCP port 80 is typically used for the hypertext transfer protocol (HTTP) and port 443 is typically used for HTTP with transport layer security (TLS), also known as HTTPS. Such ports may only be allowed for outbound TCP connections in order to enable users to access the World Wide Web but nothing else. Other ports may be allowed in addition to, or alternatively to, those above. The restriction of ports is common in many corporate or enterprise network environments, which are referred to herein as a "restricted-access network environments".

In a restricted-access network environment, a TCP TURN Server Solution may not work since the TCP TURN Server assigns Clients unique ports to uniquely identify the Client, and such port access may be restricted through the firewall.

BRIEF DESCRIPTION OF THE DRAWINGS

The present disclosure will be better understood with reference to the drawings, in which.

DETAILED DESCRIPTION OF THE DRAWINGS

The present disclosure provides a method at a computing client located behind a network address translator (NAT) and restrictive-access firewall, the method comprising: establishing a control connection with a transmission control protocol (TCP) Traversal Using Relays Around NAT (TURN) server utilizing a port capable of traversing the restrictive-access firewall; requesting an allocation of an client service identity from the TCP TURN server; and receiving, from the TCP turn server, a response containing the client service identity, wherein the client service identity is independent of any port used to communicate with the TCP TURN server.

The present disclosure further provides a computing device comprising: a processor; and a communications subsystem, wherein the computing device is located behind a network address translator (NAT) and restrictive-access firewall and is configured to: establish a control connection with a transmission control protocol (TCP) Traversal Using Relays Around NAT (TURN) server utilizing a port capable of traversing the restrictive-access firewall; request an allocation of an client service identity from the TCP TURN server; and receive, from the TCP turn server, a response containing the client service identity, wherein the client service identity is independent of any port used to communicate with the TCP TURN server.

The present disclosure further provides a method at a TCP Traversal Using Relays Around Network Address Translator (TURN) server, the method comprising: listening on a first port for communications from a computing client, the computing client being behind a restrictive access firewall and the first port capable of traversing the restrictive-access firewall; accepting a control connection with the communications client on the first port; receiving a request for an allocation of an client service identity from the computing client; and sending a response containing the client service identity, wherein the client service identity is independent of any port used to communicate with the TCP TURN server.

The present disclosure further provides a TCP Traversal Using Relays Around Network Address Translator (TURN) server comprising: a processor; a communications subsystem, wherein the TCP TURN server is configured to: listen on a first port for communications from a computing client, the computing client being behind a restrictive access firewall and the first port capable of traversing the restrictive-access firewall; accept a control connection with the communications client on the first port; receive a request for an allocation of an client service identity from the computing client; and send a response containing the client service identity, wherein the client service identity is independent of any port used to communicate with the TCP TURN server.

Figure 1:
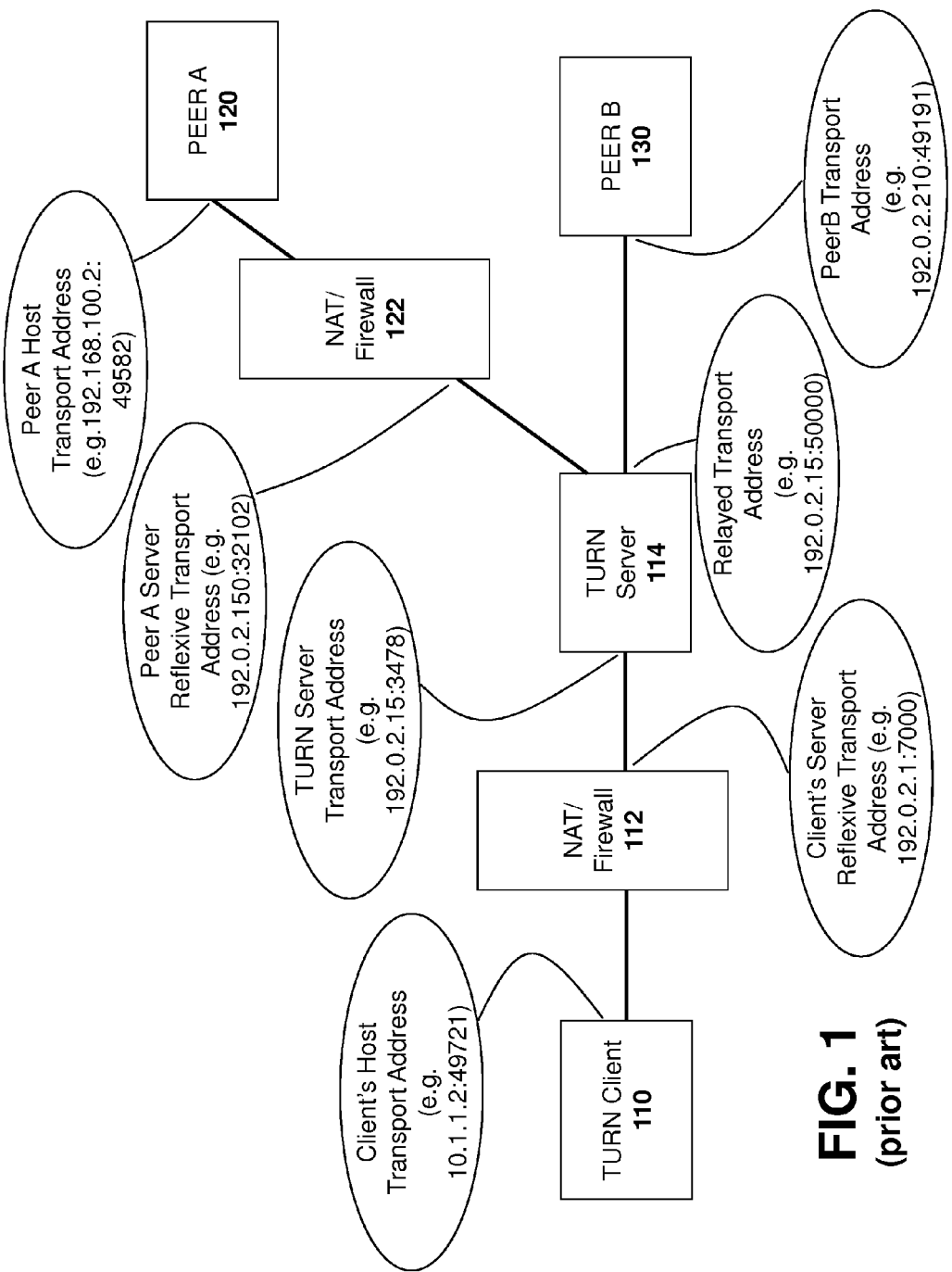
FIG. 1 is a block diagram showing an example network architecture for communication between a client and a peer using a TURN server.

Reference is now made to FIG. 1, which follows Section 2 of IETF RFC 5766. As seen in FIG. 1, a TURN client 110 is a host behind a NAT/firewall 112. As indicated in IETF RFC 5766, TURN client 110 is typically connected to a private network defined by IETF RFC 1918 and through one or more NATs 112 to the public internet.

TURN client 110 communicates with a TURN server 114 through the NAT/firewall 112. As illustrated in FIG. 1, the TURN client 110 is on the private side and the TURN server 114 is on the public side. As further indicated in Section 2 of IETF RFC 5766, TURN client 110 talks with TURN server 114 from an IP address and port combination called the client's host transport address. The combination of the IP address and transport layer protocol port (known hereafter as just "port") is called the transport address.

Thus, TURN client 110 sends TURN messages from its host transport address to transport address on the TURN server 114, known as the TURN server transport address. The TURN server transport address may be configured on the TURN client 110 in some embodiments. In other embodiments the address may be discovered by other techniques.

Further, as indicated in Section 2 of IETF RFC 5766, since the TURN client 110 is behind the NAT, TURN server 114 may see packets from the client 110 as coming from a transport address on the NAT itself. The address may be known as the TURN client's "Server-Reflexive transport address". Packets sent by the TURN server to the TURN Client's server-reflexive transport address may be forwarded by the NAT to the TURN Client's host transport address.

TURN Client 110 uses TURN commands to create and manipulate an allocation on the TURN server 114. An allocation is a data structure on the TURN server 114 and may contain, among other things, the allocated relayed transport address for the TURN Client 110. The relayed transport address is the transport address on the TURN server 114 that peers can use to have the TURN server 114 relay data to the TURN client 110. An allocation is uniquely identified by its relayed transport address. The above is specified in IETF RFC 5766.

Once an allocation is created, TURN client 110 can send application data to TURN server 114, along with an indication of which peer the data is to be sent to. The TURN server 114 may then relay this data to the appropriate peer. The communication of the application data to the TURN server 114 may be inside a TURN message and the data may be extracted from the TURN message at the TURN server 114 and sent to the peer in a user datagram protocol (UDP) datagram. Thus, in the example of FIG. 1, one of a peer 120 and a peer 130 may be selected by TURN client 110. In the example of FIG. 1, peer 120 is behind a NAT/firewall 122.

In the reverse direction, a peer, such as peer 130, can send application data to TURN server 114 in a UDP datagram. The application data would be sent to the relayed transport address allocated to the TURN client 110 and the TURN server 114 can then encapsulate the data inside a TURN message and send it to TURN client 110 with an indication of which peer sent the data.

Since the TURN message contains an indication of which peer the client is communicating with, a TURN client 110 can use a single allocation on TURN server 114 to communicate with multiple peers.

When the peer, such as peer 120, is behind a NAT/firewall 122, then the client may identify the peer using the server-reflexive transport address rather than its host transport address. Thus, as seen in FIG. 1, NAT/firewall 122 has a server-reflexive transport address of 192.0.2.150:32102 and this would be the address that TURN client 110 utilizes instead of the peer host's actual host transport address of 192.168.100.2:49582.

Each allocation at TURN server 114 is associated with exactly one TURN client 110, and thus when the packet arrives at the relayed transport address on the TURN server 114, the TURN server 114 knows which client the data is intended for. However, a TURN client 110 may have multiple allocations between itself and the TURN server 114 at one time.

IETF RFC 5766 defines the use of UDP, TCP and transport layer security (TLS) over TCP between the TURN client 110 and TURN server 114. However, only UDP is defined to be used between the TURN server 114 and a peer such as peer 120. IETF RFC 6062, *"Traversal Using Relays around NAT (TURN) Extensions for TCP Allocations"*, the contents of which are incorporated herein by reference, introduces TCP for communication between TURN server 114 and a peer such as peer 120.

The ability to utilize TCP connections between a TURN server and a peer allows the TURN client to then use an end to end TCP connection between the TURN client and the peer for services. Such services may include, but are not limited to, web browsing, for example using HTTP, file transfer, for example using file transfer protocol (FTP), instant messaging, for example using message session relay protocol (MSRP) among others.

In addition, RFC 6062 substitutes the TURN messages with TCP connections between TURN client 110 and TURN server 114. The peer to whom the application data is destined is identified by the relayed transport address, which is the IP address and port on the TURN server 114, as allocated by the TURN server 114 and sent to the TURN client 110.

As used herein, a TURN server that has the extensions for TCP in accordance with IETF RFC 6062 is referred to as a "TCP TURN Server".

Figure 2:
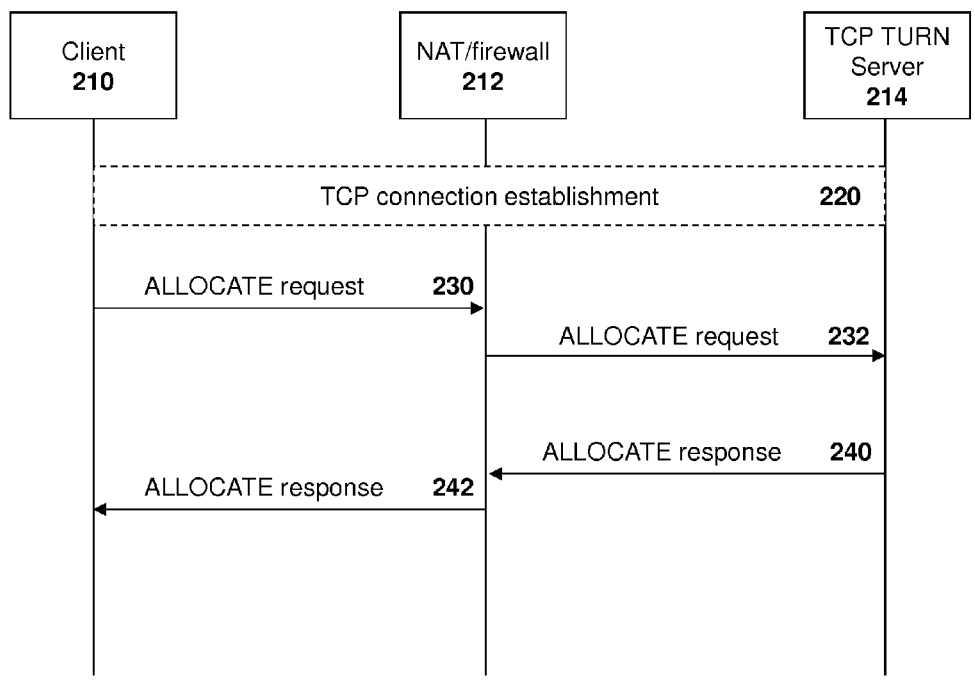
FIG. 2 is an exemplary data flow diagram showing initialization of a client to a TURN server.

In order to establish an allocation between a client and a TCP TURN Server, various messaging may be provided. Reference is now made to FIG. 2.

A TURN client 220 starts by establishing a control connection with TCP TURN server 214, as shown by block 220 in FIG. 2. The control connection is made with the TCP TURN server's transport address, which may include a well-known TURN TCP port, such as port 3478.

Next TURN client 210 sends a TURN ALLOCATE request message, as shown by arrow 230, to the NAT/firewall 212. The TURN ALLOCATE request message is then forwarded to TCP TURN Server 214, as shown by arrow 232.

TCP TURN Server 214 authenticates TURN client 210 based on the message at arrow 232. Various authentication protocols may exist and for example may be based on MD5 hashing functions. Other authentication methods would be however known to those in the art.

Assuming authentication succeeds, TCP TURN server 214 then allocates an IP address and a port for TURN client 210, known as the "relayed transport address", and sends an ALLOCATE response message back to client 210, indicating a successful allocation and containing the allocated relayed transport address. The ALLOCATE response message is shown by arrow 240 between TCP TURN server 214 and NAT/firewall 212, and by arrow 242 between NAT/firewall 212 and TURN client 210.

Once the allocation is completed on the TCP TURN server 214, two operations are possible. These operations may occur any number of times and in any order for the duration of the allocation.

Figure 3:
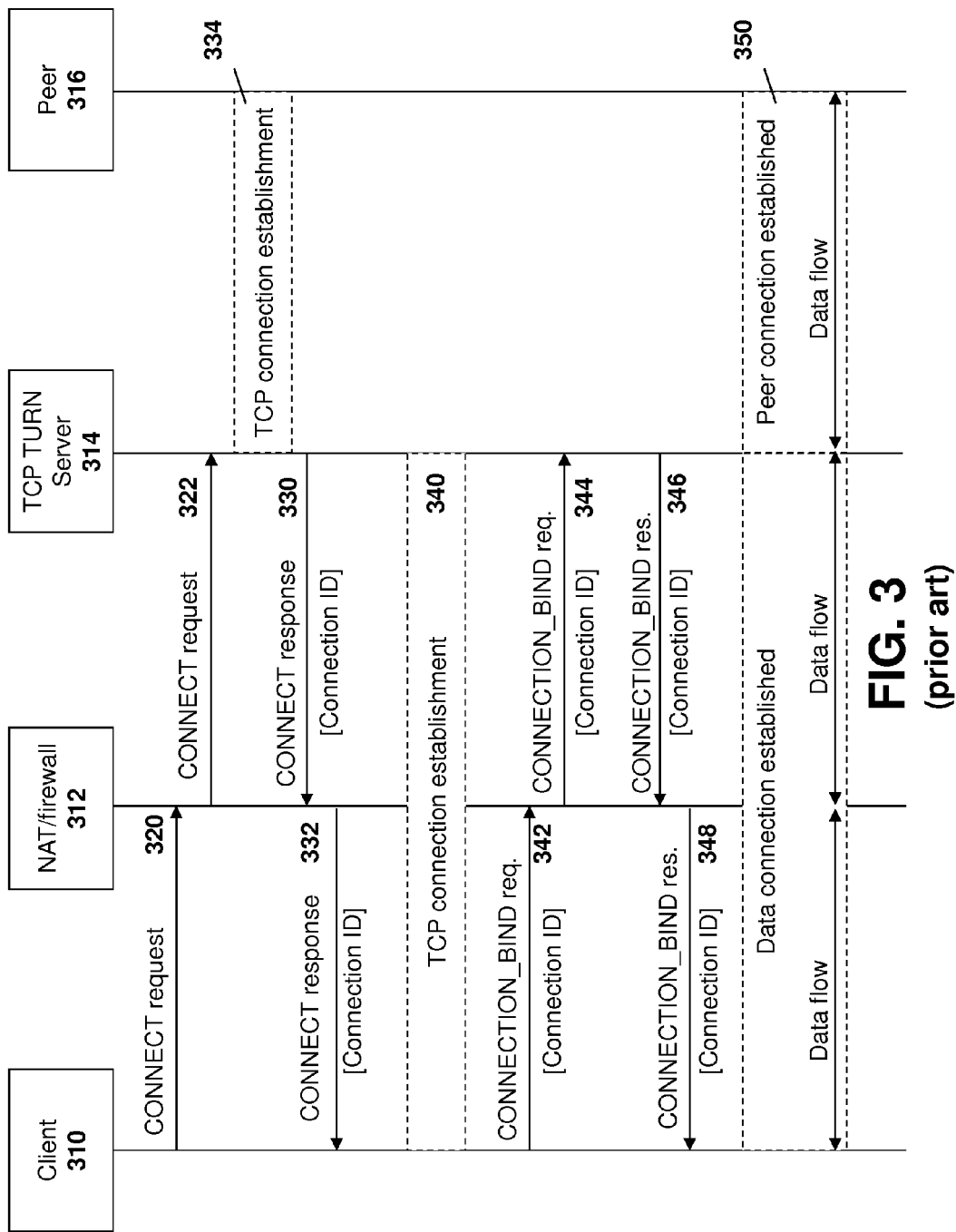
FIG. 3 is an exemplary data flow diagram showing establishment of a connection from a client to a peer through a TCP TURN server.

A first operation relates to the establishment of outbound TCP connections from a TURN client to a peer outside of the TURN client's network. Reference is now made to FIG. 3.

In order to establish an outbound connection, TURN client 310 utilizes the TCP TURN server 314 by sending a CONNECT request message over the control connection. The connect request message contains the peers outward facing IP address. Referring to FIG. 1, the outward facing IP address could be the host transport address of the Peer such as that of Peer 130 or could be the Server-Reflexive Transport Address, such as that provided by NAT/firewall 122, depending whether the Peer is behind a NAT.

Thus, as seen in FIG. 3, TURN client 310 communicates with a TCP TURN server 314 through a NAT/firewall 312. TURN client 310 wishes to establish communications with a peer 316.

The CONNECT request message, as described above is shown in FIG. 3 by arrows 320 and 322 between client 310 and NAT/firewall 312 and between NAT/firewall 312 and TCP TURN server 314 respectively.

Upon receiving the CONNECT request message at arrow 322, TCP TURN server 314 establishes a TCP connection with peer 316, as shown by block 334. The connection is referred to hereinafter as a peer connection.

After successfully establishing a peer connection, TCP TURN server 314 assigns a connection ID (connection identifier) to the peer connection and sends back the connection ID in response to the CONNECT request to the TURN client 310. The CONNECT response, with a connection ID, is shown with arrows 330 and 332 in the embodiment of FIG. 3.

TURN Client 310, upon receiving the response at arrow 332, then establishes another outbound TCP connection using a different source address (which may differ only by source TCP port), known as a "data connection" to the same transport address for TCP TURN server 314 as used in the control connection. This is shown with block 340 in the embodiment of FIG. 3.

TURN client 310 then sends a CONNECTION_BIND request message, containing the connection ID as received in the previous CONNECT response message, over the data connection to the TCP TURN Server 314. This shown with arrows 342 and 344 in the embodiment of FIG. 3.

The TCP TURN Server 314 then sends a CONNECTION_BIND response message with the connection ID back to TURN Client 310 through NAT/Firewall 312, as shown by arrows 346 and 348 in the embodiment of FIG. 3.

TCP TURN Server 314 then internally binds together the data connection established at block 340 and the peer connection established at block 334. The binding is shown by block 350 in the embodiment of FIG. 3.

After the binding, no further TURN messages are sent on the data connection and just application data packets are provided. Packets received on the data connection from the TURN client 310 are relayed by the TCP TURN server 314 "as is" over the peer connection to the peer 316. Similarly, packets received on the peer connection from the remote peer are relayed by the TCP TURN server 314 as is over the data connection to the TURN client 310.

Figure 4:
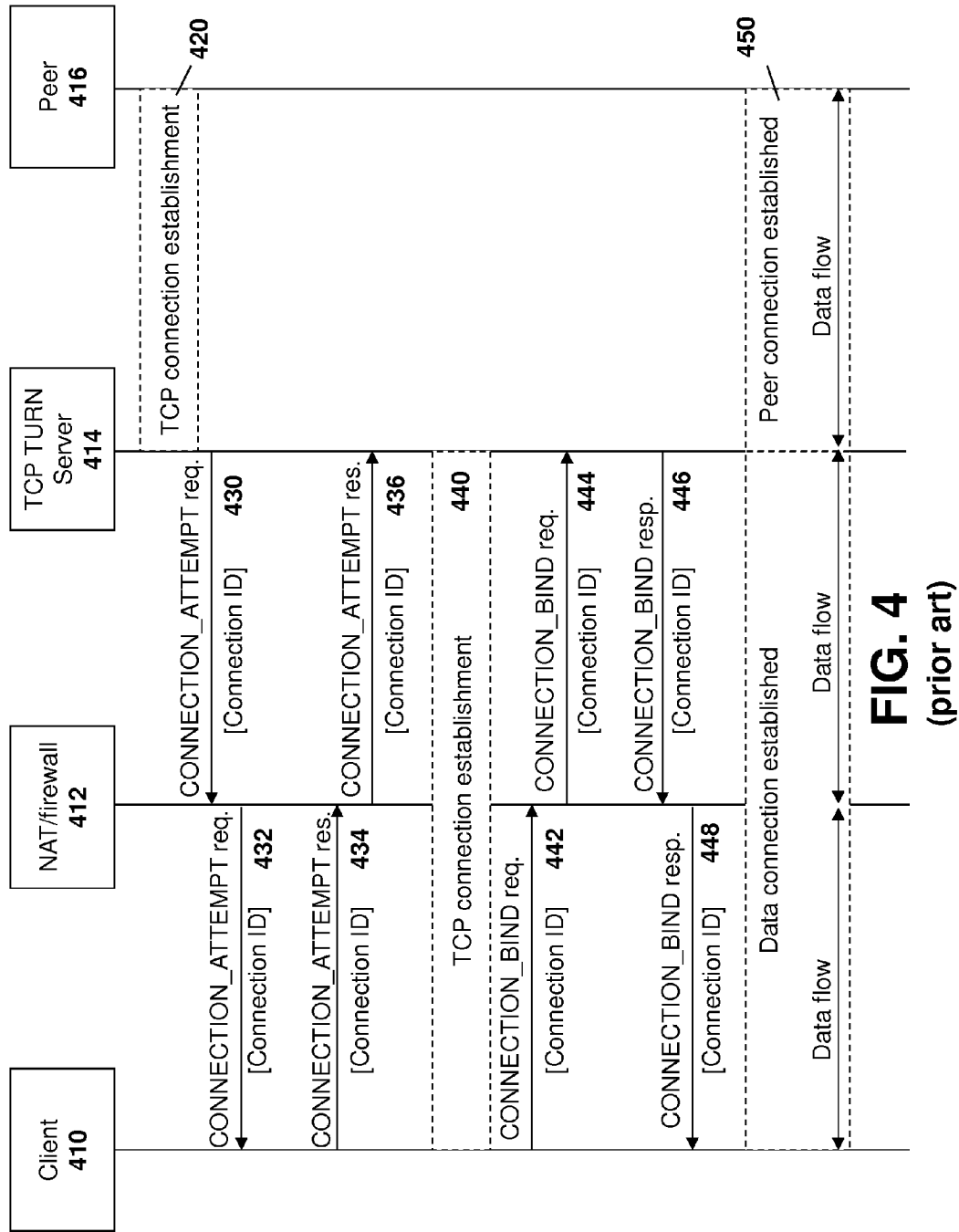
FIG. 4 is an exemplary data flow diagram showing establishment of a connection from a peer to a client through a TCP TURN server.

The second operation that may occur based on the ALLOCATION of FIG. 2 relates to the establishment of the TCP inbound connections to the TURN client from a peer outside of the TURN client's network. In other words, the peer wishes to make an outbound TCP connection to the TURN client. Reference is now made to FIG. 4.

In the embodiment of FIG. 4, a TURN client 410 already established a control connection with a TURN server 414 and a TURN server 414 allocated relayed transport address for the TURN client 410. Further, in the embodiment of FIG. 4, peer 416 wishes to establish a TCP connection with TURN client 410.

In order to establish the TCP connection, peer 416 establishes a TCP connection to the TURN client 410's relayed transport address on TCP TURN server 414. TCP TURN server 414 first accepts this TCP connection from peer 416, referred to herein as a "peer connection" and shown by block 420 in FIG. 4. TCP TURN server 414 then checks the permissions to see if remote peer 416 is allowed to make a connection to the TURN client 410. In other words, the check is made to determine whether the peer is allowed to send data to the TURN client's allocated relayed transport address on the TCP TURN server 414.

If permission is granted, the TCP TURN server assigns a connection ID to the connection and sends the connection ID in a CONNECTION_ATTEMPT request message to TURN client 410. Such message travels through NAT/firewall 414 and is shown by arrows 430 and 432 in the embodiment of FIG. 4.

TURN client 410 then sends back a CONNECTION_ATTEMPT response message to the CONNECTION_ATTEMPT request message, as shown by arrows 434 and 436 in the embodiment of FIG. 4.

If the connection attempt is accepted, TURN client 410 establishes an outbound TCP connection using a different source address (which may differ only by source TCP port), known as a "data connection", to the same transport address for TCP TURN server 414 as used in the control connection. This is shown with block 440 in the embodiment of FIG. 4.

TURN client 410 then sends a CONNECTION_BIND request message, containing the connection ID as received in the previous CONNECT request message, over the data connection to TCP TURN server 414. The CONNECTION_BIND request message which contains the connection ID travels through NAT/firewall 412 and is shown by arrows 442 and 444 in the embodiment of FIG. 4.

The TCP TURN server 414 then sends a CONNECTION_BIND response message with the connection ID through the NAT/firewall 412 to TURN client 410, as shown by arrows 446 and 448 in the embodiment of FIG. 4.

The TCP TURN server 414 then internally binds together the data connection established at block 440 and the peer connection established at block 420. The binding is shown by block 450 in the embodiment of FIG. 4.

After the binding, no further TURN messages are sent on the data connection and just application data packets are provided. Packets received on the peer connection from the remote peer are relayed by the TCP TURN server 414 as is over the data connection to the client. Similarly, packets received on the data connection from client 410 are then forwarded, as is, over a peer connection to peer 416.

With the embodiments of FIGS. 3 and 4 above, a firewall may restrict TCP connections only to certain ports for security or privacy reasons, among other reasons. For example, only TCP port 80 (e.g. for HTTP) and port 443 (e.g. for HTTPS) may be allowed for outbound TCP connections in order to enable users to access the World Wide Web but nothing else. Ports 80 and 443 are however merely provided as examples and other ports could be enabled in addition or alternatively to these two example ports.

Thus, the embodiments of FIGS. 2, 3 and 4 may not work if a client such as client 210, 310 or 410 is in a restricted access network environment and if the access to the port that is used in the TCP TURN server's transport address is blocked by the firewall. Port 3478, in some examples, is the port used in the TCP TURN servers transport address i.e. used by the TURN client to access the TCP TURN server. If this port is blocked by the firewall then the TCP connection establishment will fail/not occur.

Also, in the embodiments of FIGS. 3 and 4, peers that are in a restricted access network environment may not be able to access the TCP TURN Server since the TCP TURN Server will allocate different ports for a TURN client, and access to the TURN client's allocated port on the TCP TURN Server (i.e. in the Relayed Transport Address) may then be blocked by the firewall on the peer's local network.

In both cases above, any IP packets or data sent to the port that is prohibited by a firewall on a local network will fail indefinitely. For example, if the TCP TURN Server allocates an address/port, denoted as "$A_a/P_p$" herein after, for a Client A, and a Peer B resides on a restrictive-access network, then Peer B will not be able to establish any TCP connection to "$A_a/P_p$" if $P_p$ is restricted by the firewall. The scenario where the firewall restricts $A_a$ is not addressed herein.

Two alternative embodiments for overcoming the issue of not being able to use a TCP TURN Server through a restrictive-access-network environment are provided. In a first embodiment, a single TCP TURN Server is used. In an alternative embodiment, two TCP TURN Servers are used and the two TCP TURN Servers are linked/connected together. Each is discussed below.

One TCP TURN Server

In accordance with one embodiment of the present disclosure, a TCP TURN server may listen to only one or a subset of all possible TCP ports, where said ports may be known to the TCP TURN Server to be allowed/uninhibited/unrestricted by Firewalls. If a plurality of ports is utilized then the TCP TURN Server may listen on the first port for control connections and data connections from the clients, and listen on the second port for peer connections from the peers. All control connections, peer connections, and data connections are established on that port/those ports. The first message received on all/any TCP connections at the TCP TURN Server determines the connection type. Also, a client service identity or identifier (known herein after as a "TAG") is allocated to a Client instead of an IP address and port (i.e. Relayed Transport Address). A TAG is used in the same manner as a Relayed Transport Address on a TCP TURN Server i.e. to enable communications/IP packet flow between a Client and one or more Peers. As with a Relayed Transport Address, a TCP TURN Server may allocate a plurality of TAGs to a Client, such as to enable communication/IP traffic/packets to and from a plurality of destination TCP ports on the Client.

In the embodiments described below, the terms "listening on a port" and "monitoring traffic directed to a port number" are considered to be equivalent terms.

Initialization

As with the embodiment of FIG. 2 above, the TCP TURN Server needs to initialize with a client. In this regard, reference is made to FIG. 5.

Figure 5:
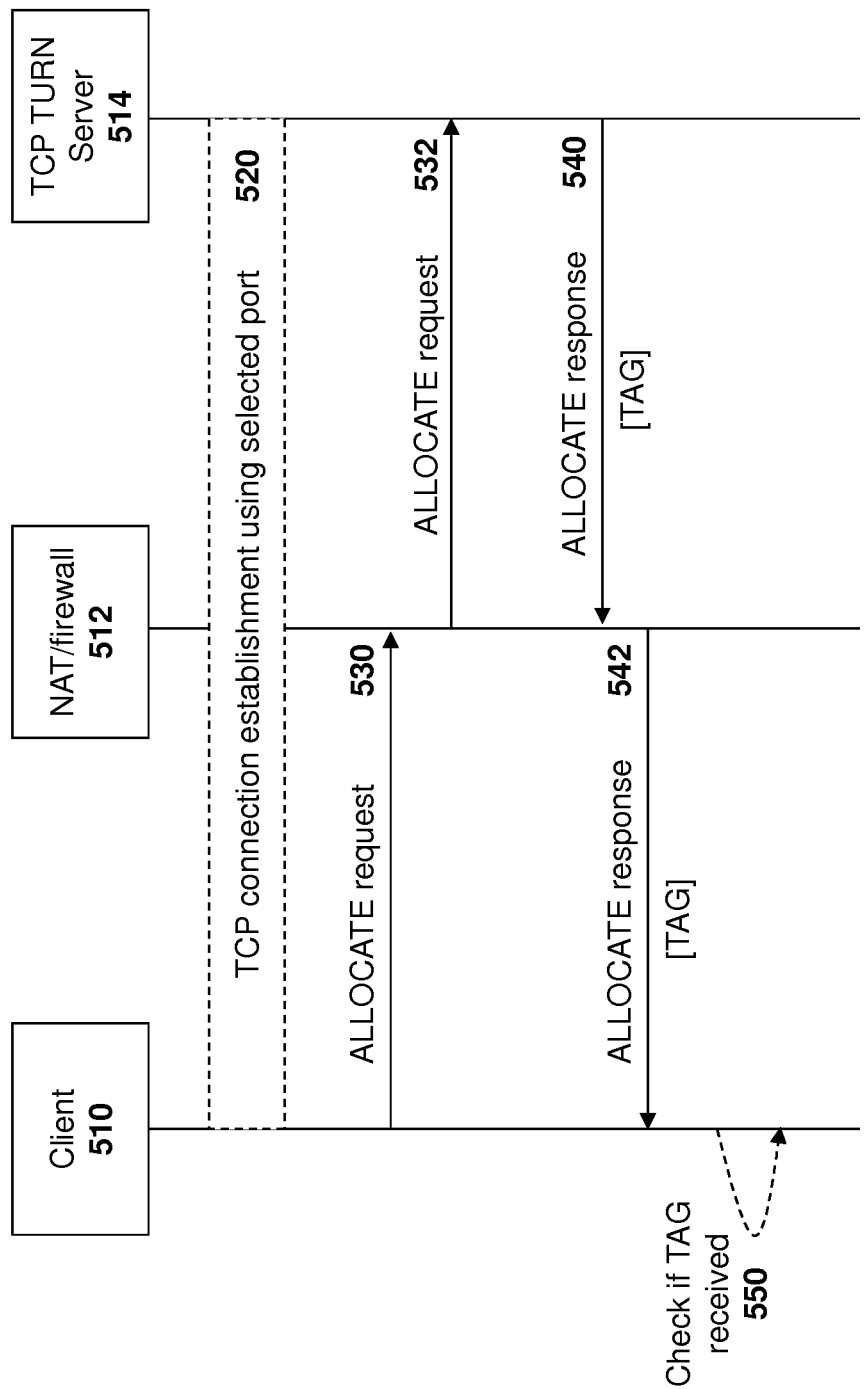
FIG. 5 is an exemplary data flow diagram showing initialization of a client to a TURN server through a restrictive access firewall.

In the example embodiment of FIG. 5, a client 510 communicates through a NAT/firewall 512 with a TCP TURN server 514.

Instead of listening on only the usual STUN/TURN ports, TCP TURN server 514 listens on one or a plurality of ports that are known, for example by configuration, to be allowed through the client's local firewall. For example, the TCP TURN server 514 may listen on ports 80, 443, among others. In some embodiments, the usual STUN/TURN port of port 3478 may also be listened on. However, this is optional and in other embodiments the STUN/TURN port does not need to be listened on.

Similar to the embodiments of FIG. 2, and as defined in IETF RFC 6062, client 510 establishes a control connection to the TCP TURN server, as shown by block 520 in the embodiment of FIG. 5. However, in the embodiment of FIG. 5, client 510 uses a port number for the underlying TCP connection that is known to be allowed through the NAT/firewall 512 entity and which is known to be serviced by the destination TCP TURN server 514.

Client 510 then sends an ALLOCATE request message through NAT/firewall 512 to TCP TURN Server 514, as shown by arrows 530 and 532.

Upon receiving the ALLOCATE request message from the client at arrow 532, TCP TURN server 514 then, instead of allocating a different address and port for the client to be used as the relayed transport address, as per IETF RFC 6062, allocates at least one and possibly more than one identifier, identity, pseudonym, alias or other identifying label, hereinafter known as a TAG. The allocated TAG is then sent to client 510 by TCP TURN server 514 in the "ALLOCATE response" message, as shown by arrows 540 and 542. Examples of TAG identifiers are provided below.

In one optional embodiment, the client 510 may check a received ALLOCATE response from a TCP TURN server 514 for the presence of a TAG. If the TAG is present in the message then the client determines that it is assigned a TAG by the TCP TURN server instead of a specific port. Otherwise, if the TAG is absent or not present in the message then the client determines that it is assigned one or more ports by the TCP TURN server pursuant to IETF RFC 6062. This may provide for backwards compatibility in which the TCP TURN Server may not be configured to provide a TAG rather than a port. The optional check is shown by dotted line 550 in the embodiment of FIG. 5.

In a further optional embodiment, the client 510 may, in the ALLOCATION request message 530, indicate to the TCP TURN server 514 its preference to use a TAG rather than a port. This may be done through the presence or absence of a value such as a flag, attribute or bit in a bit field or indicator, for example in the ALLOCATE request message. For example, the ALLOCATE request message 530 may include a TAG attribute set to a value such as a 1 or a 0. Upon receiving the ALLOCATE request message with the indication, TCP TURN server 514 may determine whether the Client is allowed to use the feature and, if so, the TCP TURN server 514 may allocate or assign a TAG to Client 510 and include the allocated TAG in the associate ALLOCATE response message. This assumes that the TCP TURN server 514 supports the TAG feature rather than the use of a port to distinguish clients. If the TCP TURN server 514 does not support the TAG feature, the bit or indicator may be just ignored at the TCP TURN server 514.

The embodiment of FIG. 5 is a simplification of the full procedure as specified in IETF RFC 6062. Additional features and functionalities not mentioned above may also be implemented and occur both on the client and on the TCP TURN server. These include, but are not limited to, failure or error handling, permission setting or checking, authentication, among others.

Once the client is authenticated with the TCP TURN Server, in order to receive incoming connections from peer entities, the client needs to advertise certain connection information to the peer entities. Under the current embodiments of IETF RFC 6062, the connection information includes at least one port on the TCP TURN server that is allocated to the client as well as an identifier of the TCP TURN server. This identifier may be the IP address, host name, or host name and domain name, such as a fully qualified domain name (FQDN), among others.

Conversely, in some embodiments of the present disclosure, the connection information instead includes at least one of the TAGs allocated to the client, the port on the TCP TURN server that the TCP TURN server is willing to accept incoming connections on from peer entities and an identifier of the TCP TURN server. Again the identifier may be the IP address, host name or host name and domain names such as the FQDN, of the TCP TURN server. Various ways to advertise the connection information are described below. The embodiments below are however not limiting, and other techniques could also be applied to ensure a peer entity obtains connection information to establish the communications with the client.

TCP TURN server 514 not only listens to the transport layer port for client communications, it also listens to one or more transport layer ports, such as TCP ports, that are known to be allowed through a firewall of one or more peer entities in order to allow incoming peer communications from peer entities. The transport layer ports may, but do not necessarily need to, differ between different connection types, including control connections, data connections and peer connections. In IETF RFC 6062, the TCP TURN server 514 differentiates between control connections, data connections and peer connections by the transport layer port requested on the TCP TURN server. However, in accordance with the embodiment of FIG. 5, one or more of the same ports may be used for two or more of control connections, data connections and peer connections, and thus the transport layer port alone requested by incoming IP connections to the TCP TURN server may not differentiate between these different connection types. In order to support differentiation between different connection types, the TCP TURN server may distinguish in accordance with the following.

If a first message received by the TCP TURN server is a valid ALLOCATE request message, and the allocation succeeds, the connection may be marked as a control connection from a client.

If a first message received by the TCP TURN server is a CONNECTION_BIND request message, and the message integrity check passes, and the connection ID contained in the CONNECTION_BIND request message is valid, then this connection may be marked as a data connection from a client.

If a first message received by the TCP TURN Server is none of the above, then the message may be marked as a peer connection from a peer and the TCP TURN server attempts to identify a valid TAG from the data or messaging received. In this case, if a valid TAG is identified or extracted then the TCP TURN server may use the TAG instead of the port number in order to identify the associated client and initiate normal procedures according to IETF RFC 6062 for triggering the client to establish a data connection to the TCP TURN server and associating the data connection with the peer connection.

Conversely, if a valid TAG is not identified or extracted, then normal procedures according to IETF RFC 6062 are applied for the case where the associated client is not found. In this case, the TCP TURN server terminates the TCP connection.

Client Initiated Communications

Figure 6:
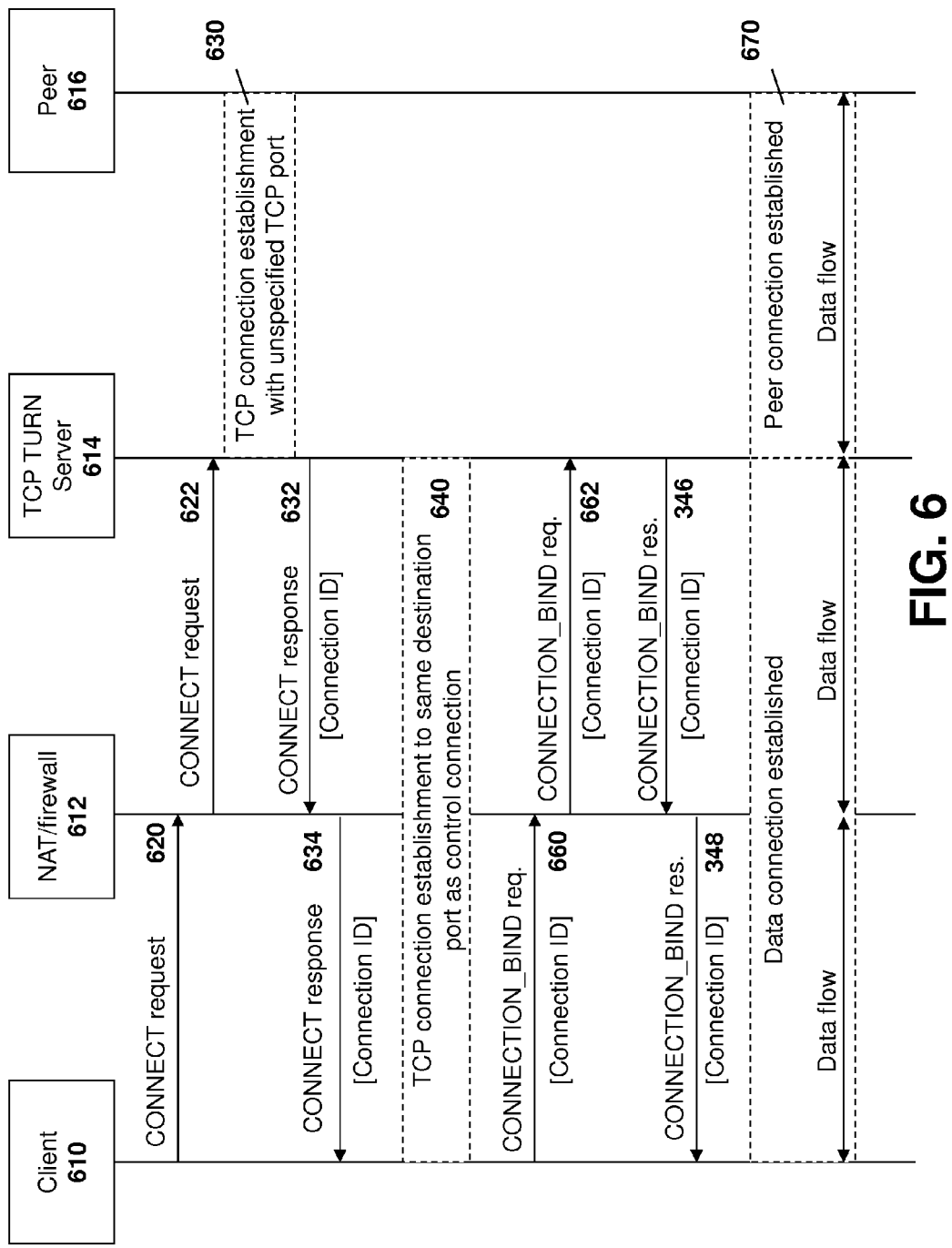
FIG. 6 is an exemplary data flow diagram showing establishment of a connection from a client to a peer through a TCP TURN server through a restrictive access firewall.

Reference is now made to FIG. 6. In the embodiment of FIG. 6, a client 610 communicates through a NAT/firewall 612 to a TCP TURN server 614, in order to initiate communication with a peer 616.

Whenever a client 610 wishes to initiate communication with a peer 616, the client sends a CONNECT request to the TCP TURN Server 614 through the NAT/firewall 612 over a control connection, as established above with regard to FIG. 5. In such case, the connect request includes XOR-PEER-ADDRESS attribute/field/information element or parameter containing the transport address of the peer to which the connection is desired. The CONNECT request message is shown by arrows 620 and 622.

Upon receiving the CONNECT request message at arrow 622, TCP TURN Server 614 then establishes a TCP connection to peer 616, using an unspecific source TCP port since there is no specific port allocated to client 610. The source TCP port used may be assigned at random or sequentially by the TCP TURN Server or by other means. How the source TCP port is assigned is superfluous to the embodiment, however, the source TCP port used needs to be not currently assigned for use with another peer or the same peer. TCP TURN server 614 then assigns a connection ID to this peer connection.

The TCP TURN server then sends a CONNECT response message back to the client which includes the connection ID, as shown by arrows 632 and 634.

Client 610 then establishes a new TCP connection to the TCP TURN Server, referred to as a "data connection", using the same destination port number to which the control connection was established, but using a different source/local port number to which the control connection was established. This is shown with block 640.

If the data connection is successfully established then the client 610 sends a CONNECTION_BIND request message containing the connection ID received in the CONNECT response message of arrow 634 over the data connection to the TCP TURN server 614, as depicted by arrows 660 and 662 in the embodiment of FIG. 6.

Upon receiving the CONNECTION_BIND request message from client 610, TCP TURN server 614 binds or associates the peer connection shown at block 630 with the data connection shown at block 640, as shown by block 670. TCP TURN sever 614 further sends a CONNECTION_BIND response with the connection ID back to client 610, as shown by arrow 672 and 674.

Thus, when the binding at block 670 is established successfully, any data, IP packets, and/or datagrams received over the data connection from the client are relayed/forwarded/proxied "as is" to the TCP TURN server over the peer connection to the peer entity. Further, all packets received over the Peer connection from the Peer entity are then relayed, forwarded or proxied by the TCP TURN server over the data connection to the client as is.

Other features or functionalities not mentioned may also be implemented. These include, but are not limited to, communication termination initiated by either the client or the peer, failure or error handling, permission setting or checking, authentication, among others.

Peer Initiated Communications

Figure 7:
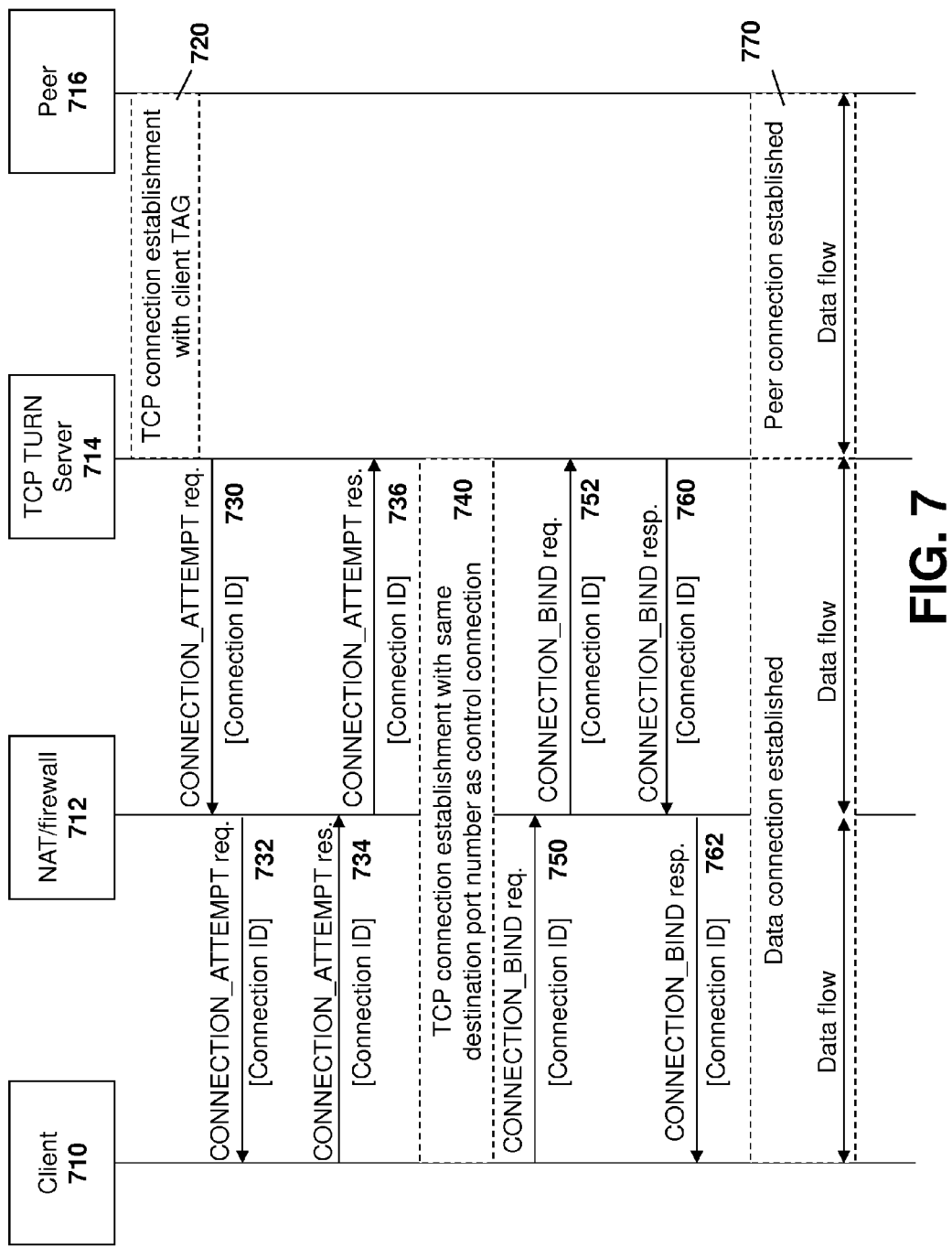
FIG. 7 is an exemplary data flow diagram showing establishment of a connection from a peer to a client through a TCP TURN server through a restrictive access firewall.

Instead of a client initiated communication as described above with reference to FIG. 6, a peer may wish to initiate communications with a client. Reference is now made to FIG. 7.

In the embodiment of FIG. 7, a client 710 communicates through a NAT/firewall 712 with a TCP TURN server 714, in order to enable a peer 716 to communicate with client 710.

When a peer wishes to initiate communication with a client 710, the peer 716 initiates a TCP connection to an IP address and port on a TCP TURN server 714. The connection is shown by block 720 in the embodiment of FIG. 7. The address and port of the TCP TURN Server are advertised by client 710 to peer 716 using an out-of-band mechanism in one embodiment. The examples of out-of-band mechanisms presented below are meant to be non-limiting and other mechanisms would be within the scope of the present disclosure. Once the TCP connection is established, it becomes the peer connection.

The peer then conveys to the TCP TURN Server 714 over the peer connection a TAG that is allocated to client 710. The TAG may be conveyed either immediately after the TCP connection has been successfully established (i.e. all TCP related signaling pertaining to the TCP connection has completed/finished) such as before the sending of any protocol message, or as part of a first application layer (layer 7) protocol messaging. If the first application layer protocol messaging is used, then the TCP TURN Server may need to be application protocol aware to recognize and extract the TAG from the application protocol.

Upon receiving and/or extracting a TAG from peer 716, the TCP TURN server 714 then uses the value of the TAG to identify and find the intended destination client 710 and find the corresponding control connection (as previously established in accordance with the embodiment of FIG. 5).

If the TCP TURN server 714 identifies a control connection, the TCP TURN server 714 then assigns a connection ID to the incoming connection from the peer entity, referred to hereinafter as a "peer connection". Thus, upon receiving and/or extracting the TAG from the Peer, the TCP TURN Server sends a CONNECTION_ATTEMPT request message containing a connection ID over an associated control connection to client 710, as shown by arrows 730 and 732.

Upon receiving the CONNECTION_ATTEMPT request message from the TCP TURN server 714, client 710 sends a CONNECTION_ATTEMPT response message back to the TCP TURN server 714, as shown by arrows 734 and 736.

The client then establishes a new TCP connection with TCP TURN server 714, the connection being referred to as a "data connection" and shown by block 740 in the embodiment of FIG. 7. The connection is established using the same destination port number to which the control connection was established but using a different source/local port number to which the control connection was established.

If the data connection is successfully established then client 710 sends a CONNECTION_BIND request message containing the connection ID received in the CONNECTION_ATTEMPT request message at arrow 732 over the data connection of block 740. The CONNECTION_BIND request is shown with arrows 750 and 752 in the embodiment of FIG. 7.

Upon receiving the CONNECTION_BIND request at arrow 752, TCP TURN server 714 then sends a CONNECTION_BIND response with the connection ID, as shown by arrows 760 and 762 in the embodiment of FIG. 7.

The TCP TURN Server 714 then binds the peer connection of block 720 with the data connection of block 740, as shown by bock 770 in the embodiments of FIG. 7.

Upon successful completion of the binding, any data, IP packets, and/or datagrams received over the data connection from the client 710 may be relayed, forwarded or proxied by the TCP TURN server 714 as is over the peer connection to the peer entity 716. Also, any packets received over the peer connection from peer 716 may be relayed, forwarded or proxied as is by the TCP TURN server 714 over the data connection to the client 710.

Additional features or functionalities may also be implemented. These include, but are not necessarily limited to, communication termination initiated by either the client or the peer, failure or error handling, permissions setting or checking, authentication, among others.

Tag Definition

A new STUN/TURN message attribute or information element may be defined for a TAG, an example of such is the following:

0x002b: TAG

In accordance with the above embodiments, any unused STUN/TURN attribute value could be used.

The value assigned to the TAG may uniquely identify each client on the TCP TURN server or uniquely identify each Client connection. If clients connected to the TCP TURN Server only wish to use one service (that is, only one TCP port on the client will be utilized), then the TAG may be the client identifier.

Otherwise, if multiple services per client are allowed (that is, a plurality of TCP ports on the client will be utilized), then the TAG is something other than the client identifier. In this case, the TAG may be a string with a fixed length of, for example, 4 bytes/octets in order efficiently use bandwidth and storage space and also to aid the TCP TURN server internal look-ups. The TAG may also be of the same format as the TCP port number i.e. a numeric-only value. The TAG may use a character encoding e.g. UTF-8, ASCII, UTF-16 amongst others.

In accordance with some of the embodiments above, the data connection, peer connection and control connection all share one port on the TCP TURN server, and methods may be used in order to differentiate between a received TAG value and a STUN.TURN message. For example, in accordance with IETF RFC 5766 and IETF RFC 5389 the first two bits of any STUN/TURN message are always "00". Thus, in order to differentiate between a received TAG value and a STUN/TURN message, the first digit or character of the value of the TAG may have a value whose first two bits are not "00".

In one example embodiment, the TAG may have a first value that is representative of letters A through to Z, assuming ASCII compatible encoding. These letters would be 01000001-01011010 in binary.

The remaining 3 characters could be any character and may, for example, be any letter from A-Z or any number from 0-9. Thus, the total number of available TAG values utilizing the above example is 26*36*36*36=1213056 different values or permutations.

When allocating a TAG value to a client, the TCP TURN server may ensure that the TAG is random and unique for all of its client connections. This ensures that the TAG is unpredictable to other TCP nodes/hosts and prevents security breaches such as denial of service attacks or TCP connection hijacking.

Conveying the Tag

As provided above with regard to block 720 of FIG. 7, before being able to accept any messages, the TCP TURN server 714 needs to negotiate and accept an incoming TCP connection. Once the incoming TCP connection is established, a TAG may be conveyed from a peer 716 to the TCP TURN server 714. Conveying of the TAG may be done in various ways not necessarily limited to the below embodiments.

In one embodiment, a simple TAG conveying/transfer procedure (such as a layer 4 (transport) protocol) may be utilized. Such a procedure occurs once the TCP connection is successfully established between the peer and the TCP TURN server, and a first message sent on the TCP connection (known as the "peer connection") may be a valid TAG. A valid TAG may be sent on its own. In other words just the value of the TAG may be sent over the peer connection. Alternatively, the TAG may be provided with an identifier that precedes it or follows it, such as the TAG attribute value for example 0x002b may be used to provide the TAG attribute value. A new identifier which is a composition of numeric, alphabetic or alphanumeric values or strings of characters may be utilized. Alternatively or in addition to a TAG attribute value, in some embodiments, a new or existing STUN/TURN message may be used to convey the TAG from the Peer to the TCP TURN Server, possibly amongst other information or data.

Alternatively, or in addition to the simple TAG transfer procedure discussed above, a layer 5 (session) protocol or above may be used.

In particular, for some applications or services it may be beneficial not to impact the peer. For example, it may be beneficial not to impact a web browser application in the peer. One way to overcome the obstacle is to embed the client's TAG in an address, identifier, uniform resource identifier (URI), or uniform resource locator (URL) in such a way as to be compatible with the application running on the peer.

For example, the conveying of the client's TAG may be done in such a way as to have an application running on the peer not perform any specific processing of the client's TAG. This then ensures that the first layer 5 (or above) message from the peer to the TCP TURN server includes the TAG. As will be appreciated, in this case the TCP TURN server needs to understand layer 5 or above protocols in order to extract the TAG from the first message.

In one embodiment using HTTP, the TAG can be embedded in the HTTP URL/URI, which ensures that it is carried in the HTTP request line in messages such as, but not limited to, the HTTP GET, HTTP POST, HTTP PUT, among others. The TAG could appear as part of the path/directory structure on the client's HTTP server software, or could be included as a part of a URI/URL query string, such as a "search part" from IETF RFC 1738 or the "query component" in IETF RFC 3986. In this case, a particular field may be denoted for the TAG and the value of the TAG may be included as the value for the field. For example, if the TCP TURN server allocates a TAG "KKDQ" for a Client that has been allocated an IPv4 address of 10.1.22.22 and is running HTTP server software, then the HTTP URL may be set to "http://10.1.22.22/KKDQ/image1.jpg" or "http://10.1.22.22/image1.jpg?TAG=KKDQ". The above embodiment could also use the string "FILE:" at the beginning instead of the string "HTTP:".

In a further embodiment, the host request-header field in the HTTP Request message may be leveraged. IETF RFC 2616 defines the host request-header field in section 14.23. To use the host request-header field, the TAG may be in the form of a valid FQDN, which is then resolved to an IP address e.g. by DNS resolution. For example, the TCP TURN Server may assign "shareservice.example.com" as a TAG for a client and the peer uses the URL/URI "http://shareservice.example.com" to reach the client. Thus, the peer initiates a peer connection to the TCP TURN server of the client and includes the TAG in a host request-header field in an HTTP method such as GET, PUT, POST, among others.

The TCP TURN server, upon receiving the HTTP method over the peer connection, extracts the value of the host request-header field from the HTTP method and uses this extracted value as the TAG. The remaining operations or procedures described above with reference to FIGS. 5, 6 and 7 may be utilized.

In a further embodiment for SIP, the TAG can be embedded in a SIP/SIPS URI/URL or a Tel URI/URL, ensuring that it is carried in such SIP methods as REGISTER, INVITE, INFO, MESSAGE, OPTIONS, among others. This may be done utilizing a "SIP parameter" rather than a "query string", but following the embodiments above for inserting the HTTP query string. One example for a SIP URI would be "SIP:foo.bar@10.1.22.22;TAG=KKDQ. An example of a Tel URI would be TEL:+1-912-555-1234;TAG=KKDQ.

In a further embodiment for FTP, the TAG can be embedded in an FTP URL/URI following the embodiments described above for inserting the HTTP path/directory. In this case, the insertion would be considered an FTP URL path in accordance with IETF RFC 1738. One example of an insertion for FTP would be "FTP://10.1.22.22/KKDQ/image1.jpg".

In a further embodiment for TELNET, the TAG can be entered by the user and conveyed from the Peer to the TCP TURN Server right after the TCP connection is established.

The above is not exhaustive and other examples of embedding the TAG are possible. For the above cases, the TCP TURN server buffers the message that has the TAG embedded and sends the buffered message to the Client upon binding the data connection and peer connection.

Out-of-Band Solutions to Advertise Connection Information

In order to connect to a client through the TCP TURN server, a Peer needs to know certain connection information including the IP address and TCP port of the TCP TURN server. Further, in accordance with the embodiments described above, the Peer also needs to know the TAG associated with the client to whom the peer wishes to communicate.

In the TCP TURN Server solution defined in IETF RFC 6062, an IP address and port, known as the Relayed Server Address, is used to identify the client to whom the peer entity wishes to communicate. However, in the solutions provided above, the TAG alone is used to identify the client, whereas the IP address and port used, although required for a connection to the TCP TURN Server, do not identify the client. Thus, as used herein, "connection info" and "connection information" are used to refer to information such as the IP address and port associated with a TCP TURN Server, and in some embodiments includes the TAG associated with a client.

In order for the peer to get the connection information, in one embodiment the STUN/TURN messaging may be extended to enable a peer to query an entity or node, such as the TCP TURN server, a proxy node for a group of TCP TURN servers, among others.

For example, a new STUN method may be defined as: "QUERY_CONNECTION_INFO" and may, for example, have an ID of 0x00a. Alternatively, an existing method may be extended, for example, the BIND method. Alternatively another protocol and message may be used such as RADIUS, DIAMETER, SIP, among others. Utilizing these messages, the peer may query the TCP TURN SERVER for the connection information.

In an alternative solution, a simple text-based message approach may be used to enable a peer to query an entity such as a TCP TURN server, a proxy node for a group of TCP TURN servers, among others, for the connection information of a particular client. A non-limiting example of such text query may be as follows:

Peer to TCP TURN Server: GET_CONNECTION_INFO [Client ID]\r\n (where "[Client ID]" is the username that the client is using in the TCP TURN server); or TCP TURN server to peer: [IP address, port, TAG]\r\n (where "[TAG]" is a TAG assigned to the requested client)

Thus, any message in any protocol may be used and a peer can query an entity or node for the connection info of the client to whom it wishes to communicate. In addition, the mechanism for the peer to discover the entity to query for the connection information may use established methods. In one embodiment the destination IP address and destination port used by the peer to query the TAG may be a destination IP address and port allowed by the policy of the firewall on the peer's local network.

In another alternative solution, the connection information may be included in an email, Short Message Service (SMS) message, an instant message, among others, sent to the peer by either the client, the TCP TURN server or another entity on behalf of the client or the TCP TURN server.

Optionally the Client's identifier information, IP address, hostname, hostname with domain name including an FQDN, among other information may be included as well in order for the receiving node to be able to associate which client has the connection info. Alternatively the source address, identifier or identity of the email, SMS message, instant message, among others, could be used by the receiving party to associate which client has the connection info.

Two TCP TURN Servers Solution

In an alternative to the above, two TCP TURN Servers may be enabled. Each TCP TURN Server may listen on an enabled port and allocate different addresses or ports for different clients.

Figure 8:
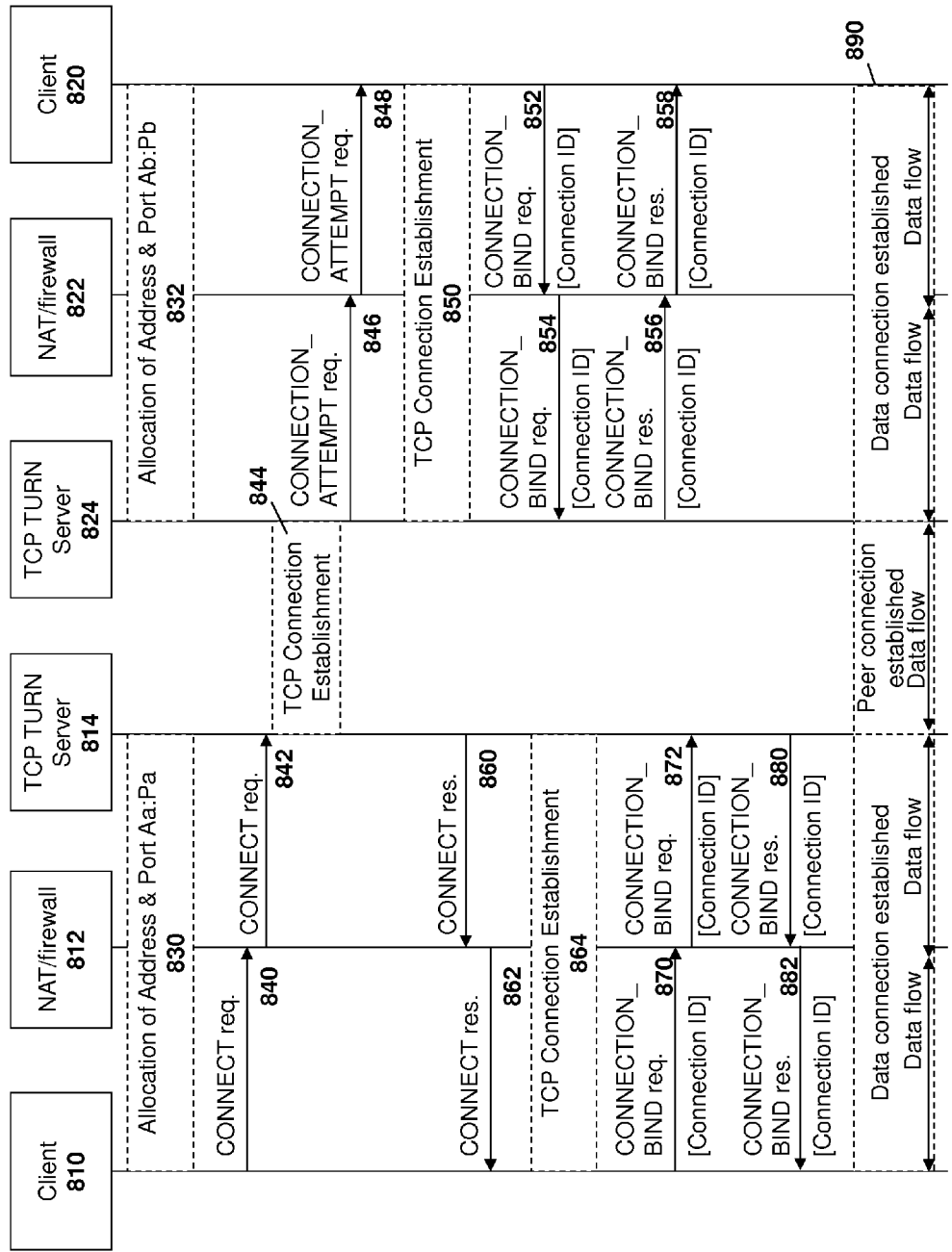
FIG. 8 is an exemplary data flow diagram showing establishment of a connection from a peer to a client through a pair of TCP TURN servers.

Reference is now made to FIG. 8, which shows a client 810 wishing to establish communication with a client 820. In the embodiment of FIG. 8, client 810 communicates with a TCP TURN Server 814 through a NAT/firewall 812. Similarly, client 820 communicates with a TCP TURN Server 824 through a NAT/firewall 822.

In the embodiment of FIG. 8, client 810 is initialized with TCP TURN server 814 in accordance with FIG. 2 above utilizing a port that is capable of travelling through NAT/firewall 812. Similarly, client 820 is initialized with TCP TURN server 824 using a port that is capable of travelling through the NAT/firewall 822.

In order for client 810 to establish communications, TCP TURN server 814 allocates an address and a port for client 810, as shown by block 830. Similarly, TCP TURN Server 824 allocates an address and a port for client 820, as shown by block 832.

Client 810 then sends a CONNECT request message to the TCP TURN Server 814 over the control connection, as shown by arrows 840 and 842.

Upon receiving the CONNECT request message at TCP TURN server 814, the TCP TURN server establishes a TCP connection from address/port Aa:Pa to address/port Ab:Pb on TCP TURN server 824. This is shown with block 844 in the embodiment of FIG. 8.

Once TCP TURN server 824 accepts the TCP connection, the connection becomes a "Peer Connection" and TCP TURN Server 824 assigns a connection identifier to the connection. TCP TURN server 824 then sends a CONNECTION_ATTEMPT request, including the connection identifier through NAT/firewall 822 to Client 820, as shown by arrows 846 and 848 in the embodiment of FIG. 8.

Upon receiving the CONNECTION_ATTEMPT request message of arrow 848, client 820 establishes a new TCP connection to TCP TURN server 824, and the new connection is referred to as a data connection and shown with block 850 in the embodiment of FIG. 8.

If the data connection at block 850 is successfully established, client 820 sends a CONNECTION_BIND request message to TCP TURN server 824, as shown by arrows 852 and 854 in the embodiment of FIG. 8, where the CONNECTION_BIND request contains the connection identifier from the message of arrow 848.

Upon receiving the CONNECTION_BIND request message from client 820, TCP TURN server 824 binds the peer connection and the data connection from the client together and a CONNECTION_BIND response is provided as shown by arrows 856 and 858.

Similarly, TCP TURN server 814, upon receiving an indication from TCP TURN Server 824 that the peer connection is established, assigns a connection identifier to the peer connection and sends the CONNECT response message with the connection identifier to client 810 over the control connection. This is shown with arrows 860 and 862 in the embodiment of FIG. 8.

Client 810 then establishes a data connection, as shown by block 864, with TCP TURN Server 814.

If the data connection at block 864 is successfully established, client 810 sends a CONNECTION_BIND request to TCP TURN Server 814 over the data connection at arrow 864, where the CONNECTION_BIND request includes the connection identifier provided at arrow 862. The CONNECTION_BIND messages are shown by arrows 870 and 872 in the embodiment of FIG. 8.

Upon receiving the CONNECTION_BIND request from the client 810, TCP TURN Server 814 binds the peer connection of block 844 and the data connection of block 864 and sends a CONNECTION_BIND response message, as shown by arrows 880 and 882.

Based on the above, the peer connection is bound to the data connection between both client 810 and TCP TURN Server 814, as well as to the data connection between client 820 and TCP TURN Server 824. The binding is shown by block 890 in the embodiment of FIG. 8.

Once the binding to both the data connections and the peer connection is complete, all IP packets received over the data connection from client 810 by TCP TURN Server 814 are transmitted over the peer connection to TCP TURN Server 824, which, upon receiving the IP packets, then relays, forwards or proxies the packets as is over the data connection between TCP TURN Server 824 and Client 820. Similarly, packets from client 820 are transferred over the data connection to TCP TURN server 824 which then relays the packets as they are over the peer connection to TCP TURN server 814. TCP TURN server 814 then relays the packets as is to client 810 over the data connection.

If the TCP TURN server 814 detects the close of the data connection from client 810, TCP TURN Server 814 disconnects or terminates the peer connection between TCP TURN Server 814 and TCP TURN server 824. Similarly, upon detecting the disconnection or termination of the peer connection, TCP TURN Server 824 then disconnects or terminates the data connection with client 820.

If the TCP TURN Server 824 detects the close of the data connection between itself and client 820, the TCP TURN Server 824 disconnects or terminates the peer connection between itself and TCP TURN server 814. Upon detecting the disconnection of the peer connection, the TCP TURN server 814 then disconnects or terminates the data connection to client 810.

In the embodiment of FIG. 8, the messages shown by arrows 846, 848, 850, 852, 854, 856 and 858 may run in parallel to the messages shown by arrows 860, 862, 864, 870, 872, 880 and 882.

Thus, in accordance with the above, the use of two TCP TURN servers allows for communication between clients through a restricted network such as an enterprise network.

Figure 9:
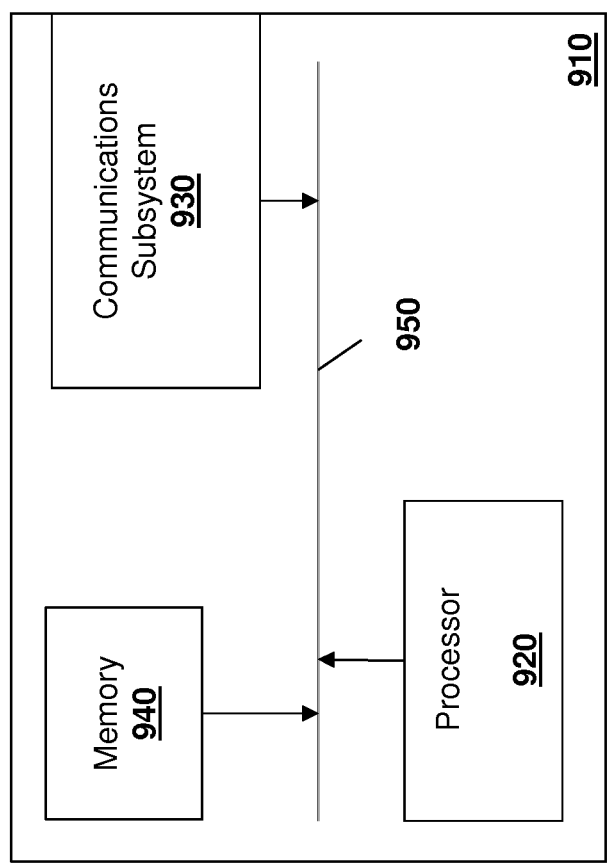
FIG. 9 is a simplified block diagram of an example computing device.

The clients, peers, TURN servers, and NATs, in the embodiments of FIGS. 1 to 8 above can be any network element, or part of any network element, including various network servers. Reference is now made to FIG. 9, which shows a generalized computing device, which may comprise a computing client, TURN server, peer computing device, NAT, among others.

In FIG. 9, computing device 910 includes a processor 920 and a communications subsystem 930, where the processor 920 and communications subsystem 930 cooperate to perform the methods of the embodiments described above.

In particular, computing device 910 may be any computer or server, and can include, for example, a network based server, a personal computer, a combination of servers, a mobile device, a tablet computer, a laptop computer, among others.

Processor 920 is configured to execute programmable logic, which may be stored, along with data, on computing device 910, and shown in the example of FIG. 9 as memory 940. Memory 940 can be any tangible storage medium.

Alternatively, or in addition to memory 940, computing device 910 may access data or programmable logic from an external storage medium, for example through communications subsystem 930.

Communications subsystem 930 allows computing device 910 to communicate with other network elements, such as a client computer through a NAT, a peer, or a TCP TURN Server, depending on the function of computing device 910. Examples of protocols for communication subsystem 930 include Ethernet, WiFi, cellular, WiLAN, among others.

Communications between the various elements of computing device 910 may be through an internal bus 950 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a computing client located behind a network address translator (NAT) and restrictive-access firewall, the method comprising:
    establishing a control connection with a transmission control protocol (TCP) Traversal Using Relays Around NAT (TURN) server utilizing a port capable of traversing the restrictive-access firewall;
    requesting, over the control connection, an allocation of a client service identity from the TCP TURN server, the requesting including an indication to the TCP TURN server that the computing client prefers to be allocated the client service identity rather than a port number; and
    receiving, over the control connection from the TCP TURN server, a response containing the client service identity,
wherein the client service identity is independent of any port used to communicate with the TCP TURN server, wherein the client service identity identifies at least one of the computing client and a service on the computing client to the TCP TURN server.

2. The method of claim 1, wherein the client service identity uniquely identifies at least one of:
    the computing client at the TCP TURN server and
    a service on the computing client.

3. The method of claim 1, wherein the receiving includes determining whether the response includes the client service identity.

4. The method of claim 1, further comprising advertising the client service identity to at least one peer computing device.

5. A computing device comprising:
    a processor; and
    a communications subsystem,
wherein the computing device is located behind a network address translator (NAT) and restrictive-access firewall and is configured to:
    establish a control connection, via the communications subsystem, with a transmission control protocol (TCP) Traversal Using Relays Around NAT (TURN) server utilizing a port capable of traversing the restrictive-access firewall;
    request, over the control connection, an allocation of an client service identity from the TCP TURN server, the request including an indication to the TCP TURN server that the computing, client prefers to be allocated the client service identity rather than port number; and
    receive, over the control connection from the TCP TURN server, a response containing the client service identity,
wherein the client service identity is independent of any port used to communicate with the TCP TURN server, and wherein the client service identity identifies at least one of the computing device and a service on the computing device to the TCP TURN server.

6. The computing device of claim 5, wherein the client service identity uniquely identifies at least one of:
    the computing device at the TCP TURN server and
    a service on the computing device.

7. The computing device of claim 5, further configured to determine whether the response includes the client service identity.

8. The computing device of claim 5, further configured to advertise the client service identity to at least one peer computing device.

9. A method at a TCP Traversal Using Relays Around Network Address Translator (TURN) server, the method comprising:

listening on a first port for communications from a computing client, the computing client being behind a restrictive access firewall and the first port capable of traversing the restrictive-access firewall;

accepting a control connection with the computing client on the first port;

receiving, over the control connection, a request for an allocation of a client service identity from the computing client;

sending, over the control connection, a response containing the client service identity;

receiving a first message after connection establishment, wherein the control connections between the computing client and the TURN server use the same port on the TURN server as data connections and peer connections, and the connection type is a peer connection if a first message after connection establishment is not one of: an allocate request and a connection bind request; and if the first message identifies a peer connection, extracting the client service identity from the first message in a session protocol layer or above, wherein the client service identity is independent of any port used to communicate with the TCP TURN server, and wherein the client service identity identifies at least one of the computing client and a service on the computing client to the TCP TURN server.

10. The method of claim 9, wherein a first message after connection establishment at the TCP TURN server determines a connection type.

11. The method of claim 9, wherein if the first message is an allocate request, the connection type is a control connection.

12. The method of claim 9, wherein if the first message is a connection bind request then the connection type is a data connection.

13. The method of claim 9, wherein the first message is the client service identity.

14. The method of claim 13, wherein the client service identity is associated with an attribute value.

15. The method of claim 9, wherein the client service identity is embedded in one of:

a uniform resource identifier; and a uniform resource locator.

16. The method of claim 9, wherein the client service identity is embedded in a host request-header of an HTTP message.

17. The method of claim 16, wherein the client service identity is a fully qualified domain name (FQDN), and the DNS resolution of the client service identity returns the IP address of the TCP TURN server.

18. The method of claim 9, wherein the TCP TURN server buffers the message that has the client service identity embedded and sends the buffered message to the computing client upon binding the data connection and peer connection.

19. The method of claim 9, wherein the request received at the TURN server includes an indication that the computing client prefers to be allocated the client service identity rather than a port number.

20. The method of claim 9, wherein the client service identity uniquely identifies at least one of:

the computing client; and a service on the computing client.

21. The method of claim 9, further comprising advertising the client service identity to at least one peer computing device.

22. The method of claim 21, wherein the advertising comprises receiving a query from the at least one peer computing device and providing the client service identity to the at least one peer computing device.

23. The method of claim 9, further comprising accepting a peer connection with a peer computing device, receiving a first message with the client service identity from the peer computing device, and sending a connection attempt request to the computing client identified by the client service identity.

24. The method of claim 23, wherein the peer connection is accepted on the first port.

25. The method of claim 23, wherein the peer connection is accepted on a second port, wherein the second port is capable of traversing a restrictive access firewall between the TURN server and the peer computing device.

26. The method of claim 9, further comprising receiving a connect request at the TCP TURN server from a computing client, the connect request containing an address for a peer computing device and the TCP TURN server uses an unspecified source port to establish a TCP connection to the peer.

27. The method of claim 9, the network upon which the peer resides is a restrictive access IP network.

28. The method of claim 9, the TCP TURN server can serve a plurality of Clients and a plurality of Peers with one of:

one port and two ports.

29. A TCP Traversal Using Relays Around Network Address Translator (TURN) server comprising:

a processor;

a communications subsystem, wherein the TCP TURN server is configured to:

listen, via the communications subsystem, on a first port for communications from a computing client, the computing client being behind a restrictive access firewall and the first port capable of traversing the restrictive-access firewall;

accept a control connection with the computing client on the first port;

receive, over the control connection, a request for an allocation of an client service identity from the computing client;

send, over the control connection, a response containing the client service identity;

receive a first message after connection establishment, wherein the control connections between the computing client and the TURN server use the same port on the TURN server as data connections and peer connections, and the connection type is a peer connection if a first message after connection establishment is not one of: an allocate request and a connection bind request; and if the first message identifies a peer connection, extract the client service identity from the first message in a session protocol layer or above, wherein the client service identity is independent of any port used to communicate with the TCP TURN server, and wherein the client service identity identifies at least one of the computing client and a service on the computing client to the TCP TURN server.

30. The TCP TURN server of claim 29, wherein a first message after connection establishment at the TCP TURN server determines a connection type.

31. The TCP TURN server of claim 30, wherein if the first message is an allocate request, the connection type is a control connection.

32. The TCP TURN server of claim 30, wherein if the first message is a connection bind request then the connection type is a data connection.

33. The TCP TURN server of claim 29, wherein the first message is the client service identity.

34. The TCP TURN server of claim 33, wherein the client service identity is associated with an attribute value.

35. The TCP TURN server of claim 29, wherein the client service identity is embedded in one of:
a uniform resource identifier and
a uniform resource locator.

36. The TCP TURN server of claim 29, wherein the client service identity is embedded in a host request-header of an HTTP message.

37. The TCP TURN server of claim 36, wherein the client service identity is a fully qualified domain name (FQDN), and the DNS resolution of the client service identity returns the IP address of the TCP TURN server.

38. The TCP TURN server of claim 29, wherein the TCP TURN server buffers the message that has the client service identity embedded and sends the buffered message to the computing client upon binding the data connection and peer connection.

39. The TCP TURN server of claim 29, wherein the request received at the TURN server includes an indication that the computing client prefers to be allocated the client service identity rather than a port number.

40. The TCP TURN server of claim 29, wherein the client service identity uniquely identifies at least one of:
the computing client and
a service on the computing client.

41. The TCP TURN server of claim 29, further configured to advertise the client service identity to at least one peer computing device.

42. The TCP TURN server of claim 41, further configured to advertise by receiving a query from the at least one peer computing device and providing the client service identity to the at least one peer computing device.

43. The TCP TURN server of claim 29, further configured to accept a peer connection with a peer computing device, receiving a first message with the client service identity from the peer computing device, and sending a connection attempt request to the computing client identified by the client service identity.

44. The TCP TURN server of claim 43, wherein the peer connection is accepted on the first port.

45. The TCP TURN server of claim 43, wherein the peer connection is accepted on a second port, wherein the second port is capable of traversing a restrictive access firewall between the TURN server and the peer computing device.

46. The TCP TURN server of claim 29, further configured to receive a connect request at the TCP TURN server from a computing client, the connect request containing an address for a peer computing device and the TCP TURN server uses an unspecified source port to establish a TCP connection to the peer.

47. The TCP TURN server of claim 29, the network upon which the peer resides is a restrictive access IP network.

48. The TCP TURN server of claim 29, the TCP TURN server can serve a plurality of Clients and a plurality of Peers with one of:
one port and
two ports.

* * * * *